United States Patent [19]

Amdahl et al.

[11] Patent Number: 4,587,611

[45] Date of Patent: May 6, 1986

[54] MULTIPLE MODULE CONTROL STORE FOR USE IN A DATA PROCESSING SYSTEM

[75] Inventors: Gene M. Amdahl, Saratoga; Hsiao-Peng S. Lee, Sunnyvale, both of Calif.

[73] Assignee: Amdahl Corporation, Sunnyvale, Calif.

[21] Appl. No.: 655,949

[22] Filed: Sep. 28, 1984

Related U.S. Application Data

[63] Continuation of Ser. No. 184,126, Sep. 4, 1980, abandoned.

[51] Int. Cl.4 .............................................. G06F 9/26
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,008,462 | 2/1977 | Kanda | 364/200 |
| 4,079,452 | 3/1978 | Larson et al. | 364/200 |
| 4,118,773 | 10/1978 | Raguin et al. | 364/200 |
| 4,124,893 | 11/1978 | Joyce et al. | 364/200 |
| 4,153,933 | 5/1979 | Blume, Jr. et al. | 364/200 |
| 4,153,937 | 5/1979 | Poland | 364/200 |

Primary Examiner—Gareth D. Shaw
Assistant Examiner—Daniel K. Dorsey
Attorney, Agent, or Firm—Fliesler, Dubb, Meyer & Lovejoy

[57] ABSTRACT

A sequencing apparatus and method employing two or more control stores for use within a data processing system. Where two-way branching exists, first and second control stores each provide control words for the common control of units within a data processing system. Whenever a branch is specified, a corresponding branch address is provided in the first control store for addressing the second control store. A nonbranch address is provided for addressing the first control store. The nonbranch address and the branch address each are employed to access concurrently control words from the first and second control stores. Upon the determination of the state of the branch condition, the appropriate one of the previously accessed control words is selected without delay and without need for an additional cycle to access the control stores.

20 Claims, 6 Drawing Figures

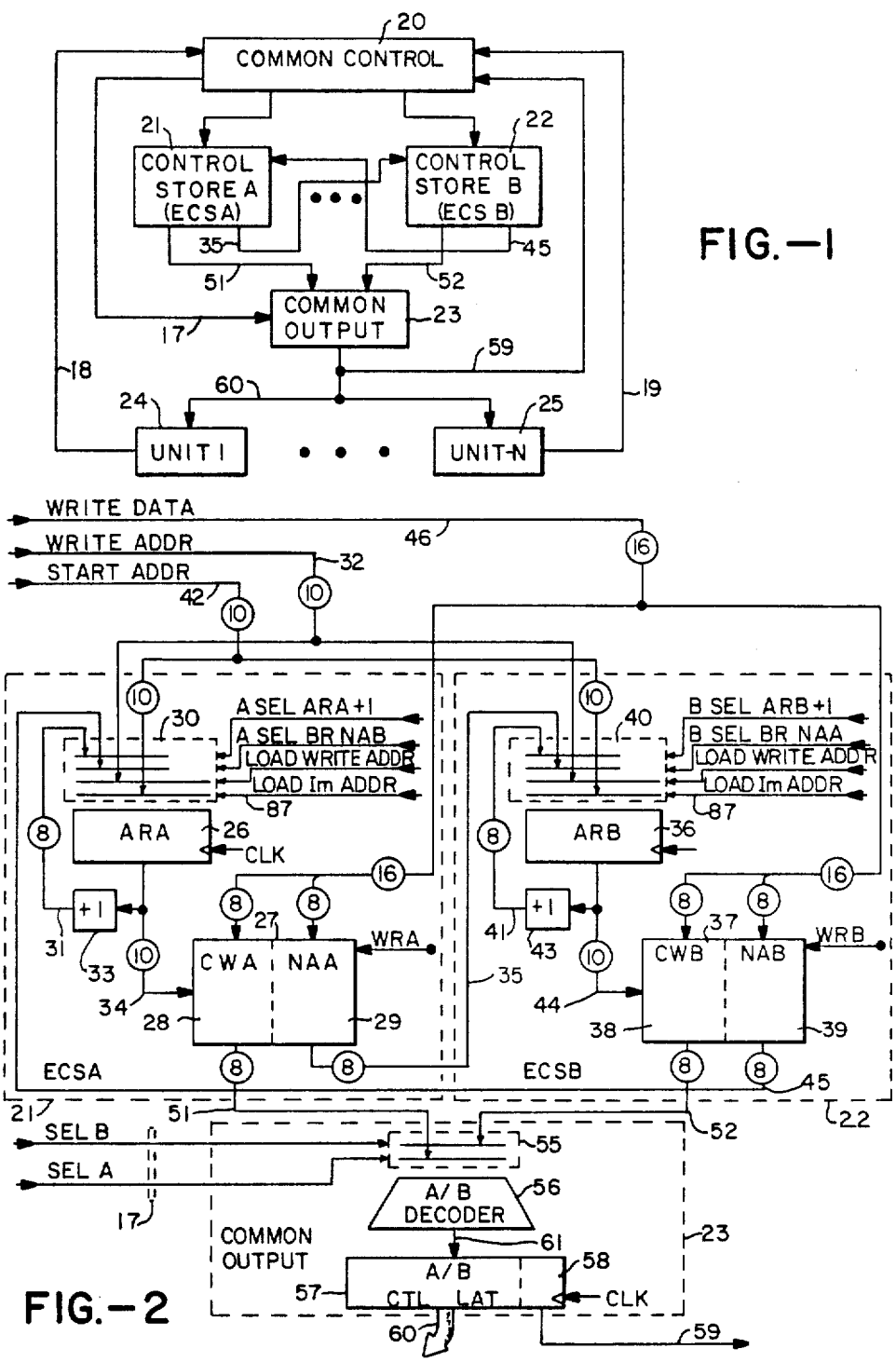

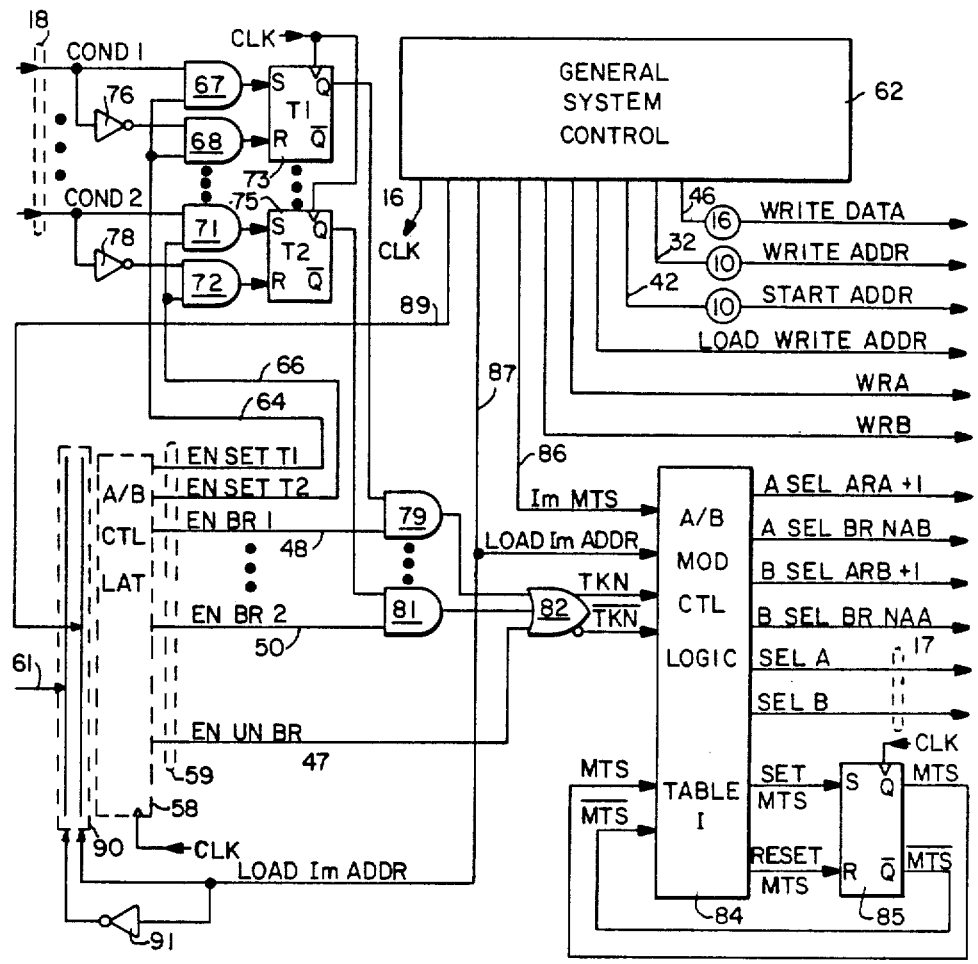
FIG.—3

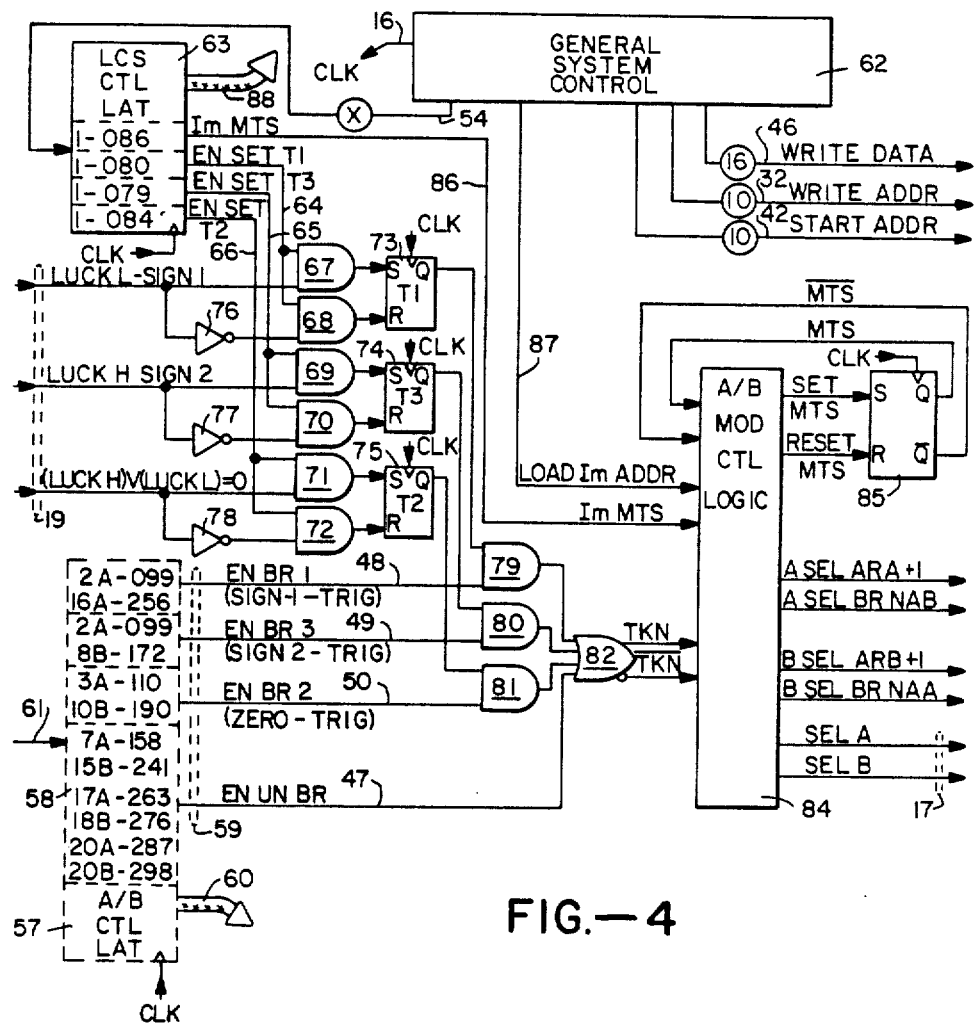
FIG.—4

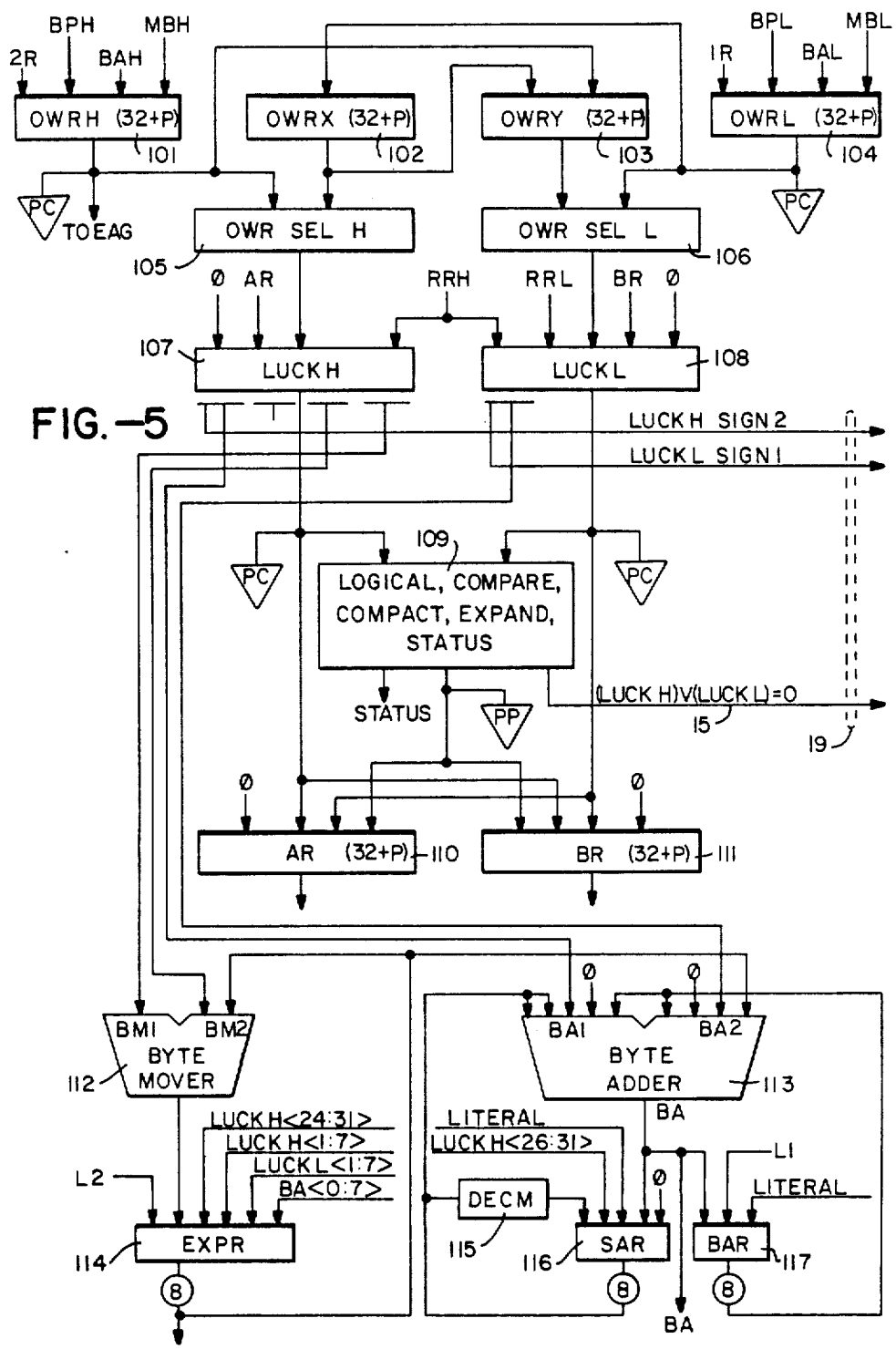
FIG.—5

MULTIPLE MODULE CONTROL STORE FOR USE IN A DATA PROCESSING SYSTEM

This is a continuation, of Ser. No. 184,126, filed Sept. 4, 1980, now abandoned.

BACKGROUND OF THE INVENTION

The present invention relates to the field of sequencing methods and apparatus in data processing systems and particularly to microprogram control stores which provide improved performance.

Sequencing apparatus in data processing systems has been of various types, included "hard-wired" logic and microprogram control stores. In high-performance data processing systems, the sequencing apparatus frequently has been implemented as "hard-wired" logic circuitry capable of generating sequencing signals at high speeds. When flexibility has been required, the sequencing apparatus frequently has been implemented using microprogram control stores.

Microprogram control stores store many control words. Each control word represents many different bits of control information. Each control bit typically controls the state of some circuit within the data processing system.

Control words are stored at memory locations in control stores and the memory locations are defined by addresses. Each accessed control word establishes the control states within the data processing system. Each time a new control word is accessed, the control states are reestablished so that control states are changed from control word to control word, thereby controlling the sequence of operations of the data processing system. Accordingly, the repeated addressing and accessing of control words from memory locations in the control store determines the sequence of operation of the data processing system. Addresses of control words in a control store are frequently called microaddress. Control words are frequently called microinstructions. Groups of microinstructions, accessable in a predetermined sequence, are frequently called microprograms.

In order to access control words from a control store in a desired sequence, control store addresses are generated, one for each control word to be accessed. The generation of addresses in a predetermined sequence defined by a microprogram and the accessing of control words from the control store in that sequence determines the sequencing of units in a data processing system.

The control store addresses are provided in a predetermined order in accordance with a microprogram. In the absence of special conditions such as branches, the predetermined order of addresses in a microprogram typically consists of the sequential addresses that are designated by positive real integers (0, 1, 2, . . . , N). Such sequential addresses are typical provided by an address counter or other incrementer which increments the current address by one count to form the next-in-order sequential address each time the control store is to be addressed.

The desired predetermined sequence of control words constituting the microprogram of control words is stored in the control store memory at the predetermined sequential addresses.

In connection with sequencing operations, microprogram branching is normally provided. Among other things, branching reduces the required capacity of the control store, provides flexibility in microprogramming and permits data dependent operations to be performed. With branching, the sequence of control store addresses and therefore the sequence of accessing control words is altered from a next-in-order address to a branch address.

For example, where the next-in-order address is formed by adding one to the previous address, a branch occurs when the next address is formed in some manner other than by adding one to the previous address.

In data processing systems, branching can be of various types. One type is the unconditional branch which occurs when, at some predetermined microinstruction control word (called the "branch point of the sequencing), the sequencing always selects the branch address rather than the next-in-order (nonbranch) address. When the branch address is selected, the branch is said to be "taken" and when the next-in-order (nonbranch) address is selected, the branch is said to be "not taken." Another type of branching is the conditional branch. Under a conditional branch, the sequence of forming addresses and of accessing control words continues until the branch point is reached. At the branch point, a branch may be taken or may not be taken depending upon the state of some branch condition. If the branch condition is satisfied, then the sequencing continues with the branch address. If the branch condition is not satisifed, then the branch will not be taken and the nonbranch address will be selected.

The time at which the state of the branch condition becomes known determines the amount of delay, if any, which will be caused in the sequencing and execution of microinstructions. If the state of the branch condition is known prior to the time that the sequencing reaches the branch point, then no delay in the sequencing need occur. If the state of the branch condition has not been determined prior to the time that the sequencing reaches the branch point, then a delay in the sequencing may occur. Without special provisions, sequencing cannot continue past a branch point until the state of the branch condition has been determined.

Conditional branches may be two-way branches, three-way branches or multi-way branches of any number. In a two-way branch, at the branch point, the sequencing has a two-way choice. If the branch is not taken, the sequencing continues to the next-in-order nonbranch address. If the branch is taken, then the sequencing is to the branch address. In a three-way branch, if the branch is not taken, the sequencing is to the next-in-order nonbranch address. If the branch is taken, one of two branch addresses must be selected. In a three-way branch, the next-in-order address, the two branch addresses and the branch conditions for determining the three-way choice must be specified in some manner. Similarly, for multi-way branching, the multiple branch addresses and the multi-way branch conditions must all be specified.

When microprogram control stores are employed in high-speed data processing systems, a control word (microinstruction) is fetched typically in one cycle (called the "fetch" cycle) of the system and is executed (employed to control some operation) in the following cycle (called the execute cycle). Because of the relatively slow speed of control store memories in comparison with the short system cycle time, it is generally not possible in high-speed systems to both fetch a control word and to execute the same control word in the same system cycle. In a system where control words of a microprogram are accessed in one cycle and are executed in the following cycle, the presence of a branch point for a conditional branch will generally cause a one-cycle delay if the state of the branch condition is not known prior to the execute cycle which specifies a branch. Branch instructions frequently occur in microprograms and one-cycle or more delays are likely to occur when branch points are reached. Such delays substantially slow down the execution of microprograms and hence degrade the overall performance of data processing systems.

Accordingly, it is an objective of the present invention to provide sequencing apparatus and particularly microprogramming control store apparatus and methods which reduce or eliminate the delays resulting from branching in the microprogram.

SUMMARY OF THE INVENTION

The present invention is a sequencing apparatus and method employing two or more control stores for use within a data processing system. Where two-way branching exists, first and second control stores each provide control words for the common control of units within a data processing system. Whenever a branch is specified by a control word from the first control store, a corresponding branch address is provided in the first control store for addressing the second control store. A nonbranch address is provided as the next-in-order address for addressing the first control store. The nonbranch address and the branch address each are employed to access concurrently control words from the first and second control stores, respectively. Since control words from the branch and nonbranch addresses are concurrently available, no delay is encountered after the state of the branch condition is determined. Upon the determination of the state of the branch condition, the appropriate one of the previously accessed control words is selected without delay and without need for an additional cycle to access the control stores.

The selected one of the control words is employed through a common output for controlling a common unit within the data processing system.

In a data processing system having microprogramming controls permitting N-way branching, a plurality of control stores (up to N-control stores) are employed and are accessed concurrently so that when the states of the branching conditions are determined, the appropriate and previously accessed control word is immediately selected without need for an additional control store cycle.

In an embodiment in which the state of the branch condition is not determined for two or more cycles after the branch point is reached in the sequencing of microinstructions, additional parallel control stores are employed to eliminate or reduce the delay otherwise encountered after branch points.

In accordance with the above summary, the present invention achieves the objective of providing an improved sequencing apparatus and method employing two or more microprogram control stores in a data processing system.

Additional objects and features of the present invention will appear from the following description in which the preferred embodiments of the invention have been set forth in detail in conjunction with the drawings.

BRIEF DESCRIPTION OF THE DRAWINGS

FIG. 1 depicts a block diagram representation of a sequencing apparatus having two or more control stores in accordance with the present invention.

FIG. 2 depicts a block diagram representation of a sequencing apparatus having dual control stores connected to a common output.

FIG. 3 depicts a schematic and block diagram representation of the common control for use with the dual control stores of FIG. 2.

FIG. 4 depicts a schematic and block diagram representation of one variation of the FIG. 3 common control apparatus.

FIG. 5 depicts a block diagram representation of one unit controlled by the sequencing apparatus of FIGS. 2 and 3.

DETAILED DESCRIPTION

General—FIG. 1

Figure 6:
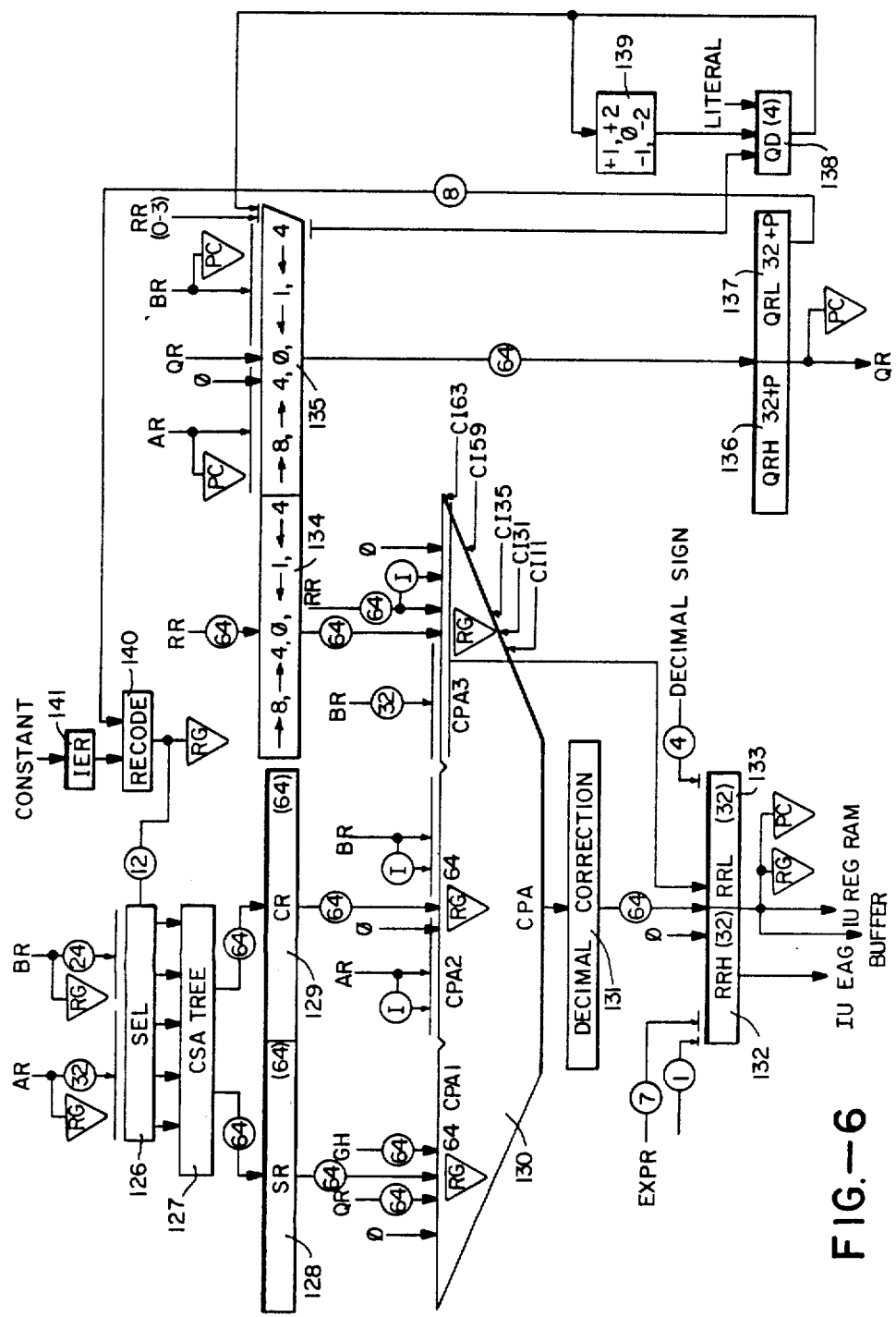
FIG. 6 depicts a block diagram representation of another unit controlled by the sequencing apparatus of FIGS. 2 and 3.

In FIG. 1, a sequencing apparatus is depicted with two or more control stores including the E CONTROL STORE A (ECSA) 21 and the E CONTROL STORE B (ECSB) 22. The control stores 21 and 22 each store microinstructions and are initiated and controlled by a common control 20. Microinstructions are selected by a common output 23 for controlling units in a data processing system and particularly for controlling the units 24 and 25.

In FIG. 1, the A control store 21 provides control words on microinstruction bus 51 to the common output 23. Similarly, the B control store 22 provides microinstruction control words on bus 52 to the common output 23. The common output 23 selects a control word from either bus 51 or from bus 52 for controlling the units 24 and 25. The A control store 21 and the B control store 22 each operate to provide control words on buses 51 and 52 once each cycle.

Each cycle, the A control store 21, also provides a branch address on bus 35 which connects as an input to the B control store 22. Similarly, each cycle, the B control store 22, provides a branch address on bus 45 as an input to the A control store 21. The common control 20 determines in each cycle and for both of the A and B control stores 21 and 22 whether the branch address from the other control store is to be utilized or whether a nonbranch address is to be selected. The common control 20 receives on lines 59 an indication from the common output 23 whether or not a branch is specified by the current control word. Common control 20 senses via lines 18 and 19 the state of branch conditions within the controlled units 24 and 25 and decides whether or not any branch is to be taken. The common control 20, via lines 17, controls the common output 23 to select the microinstruction control word from the A or B control stores 21 or 22. The selected one of the control words controls the state of the units 24 and 25.

In FIG. 1, the three dots between the control store 21 and the control store 22 indicate that one or more additional control stores like control stores 21 and 22 may be connected in parallel. In such a structure, the common control 20 includes an input to each of the additional control stores. Further, each of the additional control stores provides a microinstruction bus to the common output 23. The common output 23 then functions to select a control word from any one of the control stores. Similarly, the branch address input to each of the additional control stores is typically provided from either or both of the branch address bus lines 35 and 45. Further, the additional control stores typically connect a branch address bus as an input to each of the control stores 21 and 22. Appropriate selection means is provided for selecting among the different branch addresses provided by the multiple control stores.

Dual Control Store Sequencing Apparatus—FIG. 2

In FIG. 2, one particular preferred dual store embodiment of the control stores and common output portion of the FIG. 1 sequencing apparatus is shown. The A control store 21 is designated the E CONTROL STORE A (ECSA) and the B control store 22 is designated the E CONTROL STORE B (ECSB). The A control store 21 and the B control store 22 have 8-bit microinstruction control word buses 51 and 52, respectively, connected as inputs to a common output 23.

Both the A control store 21 and the B control store 22 receive common inputs including the 10-bit starting address (START ADDR) bus 42, the 10-bit write address (WRITE ADDR) bus 32 and the 16-bit write data (WRITE DATA) bus 46.

The A control store 21 provides the 8-bit next address A(NAA) bus 35 as an input to the B control store 22. Similarly, the B control store 22 provides the 8-bit next address B(NAB) bus 45 as an input to the A control store 21.

The internal structure of the A control store 21 and the B control store 22 are substantially identical. Control stores 21 and 22 each include memories 27 and 37, respectively, having 8-bit control word (CWA and CWB) portions 28 and 38, respectively, and having 8-bit next address (NAA and NAB) portions 29 and 39, respectively. The output from the CWA portion 28 is the microinstruction control word bus 51 and the output from the CWB portion 38 is the microinstruction control word bus 52. The outputs from the NAA portion 29 and the NAB portion 39 are the next address buses 35 and 45, respectively. In a typical embodiment each of the control stores 27 and 28 stores 1,024 16-bit words addressable by 10-bit addresses.

Both of the control word portions 28 and 38 and the next address portions 29 and 39 are addressed together by the address on the 10-bit address buses 34 and 44, respectively. The addresses on buses 34 and 44 will normally operate to read data from each of the portions of the memories 27 and 37. Memories 27 and 37 can be implemented as conventional read only memories (ROM'S). However, in the present example, read/write random access memories (RAM'S) are employed for greater flexibility in changing microprograms. The 16-bit WRITE DATA bus 46 connects in parallel to write data into each of the memories 27 and 37. Writing of data occurs whenever the WRA and the WRB signals are energized to indicate a write in the memories 27 and 37, respectively. When not energized to indicate a write, those signals designate the read state for the memories. For purposes of the present invention, the writing of data into the memories can be ignored, it being assumed that throughout the control operation, the memories have been previously properly loaded and hence no writing into the memory occurs.

The addresses for writing and reading data into and from the memories 27 and 37 are from the 10-bit A address register (ARA) 26 and the 10-bit B address register (ARB) 36. The A and B address registers 26 and 36 are loaded by the gates 30 and 40, respectively. Each of the gates 30 and 40 has four sources of input addresses for loading the address registers. Whenever a write operation is to occur, both registers 26 and 36 are loaded by the 10-bit address from the write address bus 32 under of the LOAD WRITE ADDR line from the general system control 62 of FIG. 3. Similarly, both registers 26 and 36 are loaded by the 10-bit starting address (START ADDR) from the bus 42 under control of the LOAD ImADDR signal. Both the START ADDR bus 42 and the LOAD ImADDR line 87 come from the general system control 62 of FIG. 3 for initiating the dual control store sequencer of FIG. 2.

The initiation comprises loading all ten bits of the registers 26 and 36 with the starting address. Thereafter, during operation, the two high-order address bits remain unchanged while the eight low-order bits in the registers 26 and 36 are loaded by either the next-in-order address or by the branch address. In the A control store 21, the branch address is loaded from the NAB branch address bus 45 under control of the signal line A SEL BR NAB provided by the control circuitry of FIG. 3. In FIG. 2, the next-in-order nonbranch address is loaded into the ARA register 26 by the 8-bit bus 31 from the +1 incrementer 33 under control of the A SEL ARA +1 signal line from the common control of FIG. 3. The incrementer 33 is a conventional device which adds a count of 1 to the eight low-order bits from the ARA register 26. The low-order eight bits are employed merely as a matter of convenience since such number of bits is adequate for the present embodiment. Of course, more or fewer bits can be employed in accordance with the needs of any particular embodiment of the present invention.

In FIG. 2 the operation of the A control store 21 starts out at the initial address provided by the START ADDR bus 42 when the LOAD ImADDR signal is received. Thereafter, either the next-in-order non-branch address from incrementer 33 is selected by control signal A SEL ARA +1 or the branch address from the branch address bus 45 is selected by the A SEL BR NAB signal.

In FIG. 2, the address register 36 of the B control store 22 is loaded by the gate 40 from four different sources. The address from WRITE ADDR bus 32 is loaded into register 36 under control of the LOAD WRITE ADDR signal from FIG. 3.

In FIG. 2, the B control store 22 receives the starting address (START ADDR) from bus 42 under control of the LOAD ImADDR signal from the common control of FIG. 3. After being initially loaded, control store 22 in each cycle is loaded with the branch address from the NAA bus 35 under control of the B SEL BR NAA signal or is loaded with the next-in-order address from the +1 incrementer 43 under control of the B SEL ARB +1 signal.

In FIG. 2, when addressed, both the A control store 21 and the B control store 22 access control words onto the microinstruction control word buses 51 and 52 once each cycle. Each of the control words CWA and CWB is accessed from the address locations specified by the addresses in the ARA register 26 and the ARB register 36, for the CWA portion 28 and the CWB portion 38, respectively. Although each control store provides a control word once each cycle, only one of the control words CWA or CWB is selected for use in each cycle.

In FIG. 2, the common output 23 functions to select the CWA microinstruction control word from the A bus 51 or the CWB microinstruction control word from the B bus 52. The selection is made in the common output 23 by the gates 55. Under control of the SEL A signal, gate 55 selects the CWA control word from the A control store bus 51 and, under control of the SEL B signal, gate 55 selects the CWB control word from the B control store bus 52. The selected one of the control words from bus 51 or 52 is input to a decoder (A/B DECODER) 56. The decoder 56 can be any conventional decoder, logic array, read-only memory or other mapping device which maps inputs to outputs. Decoder 56 functions to decode the selected 8-bit CWA or CWB control word to form up to several hundred or more decoded output bits on bus 61. The decoded output bits on bus 61 are latched into a conventional latch (A/B CTL LAT) 57. Latch 57 has as many bits as the output on bus 61. Decoder 56 is employed since in one embodiment the CWA and the CWB microinstruction control words are encoded. Encoding of the control words is optional and may be avoided by increasing the number of bits in the CWA and CWB control words.

In FIG. 2, one section 58 of the latch 57 includes a subset of the control bits from decoder 56. Section 58 provides outputs on lines 59 for controlling the operation of the common control of FIG. 3. In particular, the lines 59 include one or more bits for enabling the setting of triggers which indicate whether or not a branch condition is satisfied. One or more lines 59 provide enable signals for signalling when a branch point has been reached. Additionally, the latch 57 provide the output bus 60 which connects to the various units to be controlled, such as units 24 and 25 in FIG. 1.

Common Control—FIG. 3 and TABLE I

In FIG. 3, one embodiment of the common control 20 of FIG. 1 is shown in further detail. The common control includes a general system control 62. The general system control 62 may be any conventional circuitry such as found in a data processing system. The function of control 62 is to provide timing signals by means of a conventional clock (CLK) signal on line 16, a starting address (START ADDR) on the 10-bit bus 42, a command signal (LOAD ImADDR) on line 87 and a command line (ImMTS) 86. The signals on line 87 signifies that the START ADDR signal is to be selected and the signal on line 86 indicates whether the A control store 21 or the B control store 22 is to be selected. The various write signals including WRITE DATA, WRITE ADDR, LOAD WRITE ADDR, WRA and WRB are used for loading the control stores 27 and 37 of FIG. 2 but are not otherwise active during the operation of the present apparatus. Such write signals are not provided when a read only memory embodiment is employed.

The signals on lines 86 and 87 connect as inputs to A/B module control logic (A/B MOD CTL LOGIC) 84. Other inputs to the logic 84 are the TKN and the $\overline{TKN}$ lines from OR/NOR gate 82 for signifying that a branch has been taken or not taken, respectively. Gate 82 functions as a branch taken indicator for indicating whether a branch is taken or is not taken.

Additional inputs to the logic 84 include the MTS and $\overline{MTS}$ lines which signify the state of the module select trigger 85. Trigger 85 is a conventional set/reset trigger which functions as a selection store to store a selection signal (MTS/$\overline{MTS}$) for indicating which one of the control stores 21 or 22 was last active for providing a selected microinstruction control word.

In FIG. 3, the control logic 84 provides the output signals A SEL ARA +1, A SEL BR NAB, B SEL ARB +1, B SEL BR NAA, SEL A and SEL B which all connects as inputs to the dual control store sequencer apparatus of FIG. 2 and which perform the functions previously described in connection with FIG. 2.

In addition to the output signals connected to FIG. 2, the control logic 84 of FIG. 3 provides the SET MTS signal line to the set (S) input of trigger 85 and the RESET MTS line to the reset (R) input to the trigger 85. The Q and the $\overline{Q}$ outputs from the trigger 85 provide the MTS and the $\overline{MTS}$ control store selection signals. The trigger 85 operates to set the MTS and $\overline{MTS}$ outputs as a function of the SET MTS and RESET MTS inputs when clocked by the clock signal CLK.

The logic circuit 84 is conventional logic circuitry which may be implemented as logic gates in any conventional manner in accordance with the Boolean expressions set forth in the following TABLE I.

TABLE I

| SIGNAL | LOGICAL DEFINITION |
|---|---|
| A SEL ARA + 1 = | (MTS)($\overline{TKN}$)v($\overline{MTS}$)(TKN) |
| A SEL BR NAB = | (MTS)(TKN)v($\overline{MTS}$)($\overline{TKN}$) |
| B SEL ARB + 1 = | ($\overline{MTS}$)($\overline{TKN}$)v(MTS)(TKN) |
| B SEL BR NAA = | ($\overline{MTS}$)(TKN)v(MTS)($\overline{TKN}$) |
| SEL A = | (MTS)($\overline{TKN}$)v($\overline{MTS}$)(TKN) |
| SEL B = | ($\overline{MTS}$)($\overline{TKN}$)v(MTS)(TKN) |
| SET MTS = | (MTS)($\overline{TKN}$)($\overline{LOAD\ ImADDR}$) |
|  | v($\overline{MTS}$)(TKN)($\overline{LOAD\ ImADDR}$) |
|  | v(ImMTS)(LOAD ImADDR) |
| RESET MTS = | (MTS)(TKN)($\overline{LOAD\ ImADDR}$) |
|  | v$\overline{MTS}$ ($\overline{TKN}$)($\overline{LOAD\ ImADDR}$) |
|  | v($\overline{ImMTS}$)(LOAD ImADDR) |

In TABLE I, the output signals from the logic 84 are represented by the left-hand SIGNAL column. The logical circuitry included in the logic 84 is specified in the right-hand column LOGICAL DEFINITION which defines the specific circuitry required in terms of the input signals to logic circuitry 84. In TABLE I, the space between closing and opening parenthetical marks, namely ")(" indicates the logical AND function and the symbol "v" indicates the logical OR function. The symbol " —— " indicates the "inverted" or "not" function.

In FIG. 3, the branch taken and not taken OR/NOR gate 82 receives inputs from the outputs of the AND gates 79 and 81. The three dots between gates 79 and 81 indicate that any number of additional gates can provide inputs to the gate 82 if additional conditions on which branches are to be taken are present. One of the inputs to each of the AND gates 79 and 81 is derived from the branch condition stores comprising triggers 73 and 75 and the other inputs EN BR 1 and EN BR 2 are from latch 58. Th gates 79, . . . , 81 are interrogation means responsive to the current control word in latch 58 for interrogating the state of the branch stores comprising the T1 and T2 triggers 73 and 75. Triggers 73 and 75 are conventional set/reset triggers or their equivalent which establish their outputs to indicate whether or not a branch condition is satisfied as a function of the set and reset inputs and at the time that a clock signal CLK is present. The set inputs (S) to the condition triggers 73 and 75 are controlled by AND gates 67 and 71, respectively. Similarly, the reset inputs (R) to triggers 73 and 75 are controlled by AND gates 68 and 72, respectively. In addition to branch conditions in the microprogram, the triggers 73 and 75 are also employed for other purposes, such as for non-branch control purposes or as part of the data itself.

The gates 67 and 68 are enabling means responsive to the current control word. The current control word provides an enable signal EN SET T1 from the A/B control latch 58 to enable gates 67 and 68. Similarly the gates 71 and 72 are enabling means responsive to be enabled by the current control word which provides an enable signal EN SET T2 from the latch 58.

The gate 67 receives a branch condition or other signal, COND 1 which derives from a unit 24 of FIG. 1 to indicate whether or not a particular condition is satisfied or not. The COND 1 signal is inverted in inverter gate 76 as an input to the gate 68.

If the COND 1 is set as a logical 1, then gate 67 is satisfied to set the trigger 73. If the COND 1 is a logical 0, that 0 is inverted in inverter 76 to satisfy gate 68 and reset the trigger 73.

In a similar manner, the COND 2 signal from a unit 24 or 25 will either set or reset the trigger 75 whenever the enable signal EN SET T2 on line 66 is a logical 1 and the next clock signal CLK has occured. In FIG. 3, the trigger 73 and 75 function to indicate at an appropriate time determined by a microinstruction command from the control latches 58 whether or not a branch condition or other control condition is satisfied or not.

In FIG. 3, EN BR 1 signal is an enable signal connected to the AND gate 79 which determines when the state of the trigger 73 is examined. Similarly, the EN BR 2 signal on line 50 is input to the AND gate 81 to determine when the state of the trigger 75 is examined. The gates 79 and 81 are characterized as interrogation means (for interrogating the condition stores 73 and 75) which are enabled in response to a microprogram control word. The enable signals on one or both of the lines 48 and 50 from latch 58 will be active as a logical 1 when a microinstruction control word specifies a branch condition, that is, that a branch point has been reached.

In FIG. 3, when a branch is indicated by either of the lines 48 or 50 being enabled, and either one of the respective branch condition triggers 73 or 75 is set to indicate the branch condition is satisfied, then either one of the gate 79 or 81 will be satisfied to provide a logical 1 branch taken signal to indicate that the branch is taken and responsively causing gate 82 to provide a logical 1 for the TKN signal and a logical 0 for the $\overline{\text{TKN}}$ signal. The branch taken signal lines input to gate 82 from gates 79 and 81 and gate 82 are characterized as branch taken indicator means and are also characterized as part of the interrogation means.

In FIG. 3, line 47 from latch 58 provides, in response to a microinstruction command, an unconditional branch enable signal (EN UN BR) which provides an input to OR/NOR gate 82.

In FIG. 3, the gates 90 are provided for gating data into the portion 58 of the AB control latches from either the decoder output bus 61 of FIG. 2 or from a bus 89 from the general system control 62. Whenever the system control 62 indicates a new start-up condition by an active LOAD ImADDR signal, the contents of the bus 89 are loaded into the latches 58. Inverter 91 inverts the signal on the line 87 to form $\overline{\text{LOAD ImADDR}}$ to select the contents from bus 61 output from the decoder 56 of FIG. 2.

In a variation of the FIG. 3 embodiment, any of the control signals from the general system control 62 are stored in the latch 58.

Typical Operation—TABLES II, III, and IV

For purposes of explanation, a microprogram has been assumed which consists of a number of microinstruction control words which are located at various addresses in both the A control store 21 and the B control store 22 in FIG. 2. Those addresses for the assumed microprogram are addresses 10, 11, 12, 13, 14, 15, 21, 22, 23, 24, 31, 32, 33, 34, 35, 41, 51, 52, 53, 61 and 0. Furthermore, the sequencing of addresses is such that a branch point occurs at address 11 based upon the state of a condition 1 as set in the T1 trigger 73. The execution of the control word accessed from address 11 enables the branch point indication which causes trigger T1 to be interrogated. If the branch is not taken, the next-in-sequence address 12 is selected and if the branch is taken, the 21 branch address is selected. Further, the 21 address has a branch based upon a second condition as set in the T2 trigger 75 which if taken is to the 31 address. The 32 address has a branch based upon the T1 trigger which, if taken, is to the 41 address. The 33 address has a branch based upon the T2 trigger which, if taken, is to the 51 address. The 52 address has a branch based upon the T1 trigger which, if taken, is to the 61 address. Unconditional branches to the 0 address occur at addresses 15, 24, 35, 53 and 61.

The possible fetch-cycle sequencing of addresses as a function of the branching conditions is shown in the following TABLE II. In cycle 0, the starting address 10 is supplied and is incremented so that cycle 1 provides for the fetching of the control word at the 11 address.

TABLE II

| FETCH CYCLE | ADDRESSES | | | | | |
|---|---|---|---|---|---|---|
| 0 | 10 | | | | | |
| 1 | 11 —T1— | | | | | |
| 2 | 12 | 21 —T2— | | | | |
| 3 | 13 | 22 | 31 | | | |
| 4 | 14 | 23 | 32 ——————T1—————— | | | |
| 5 | 15 —UN BR— | 24 —UN BR— | 33 —T2— | | | 41 —UN BR— |
| 6 | | 0 | 0 | 34 | 51 | 0 |
| 7 | | | | 35 —UN BR— | 52 —T1— | |
| 8 | | | | 0 | 53 —UN BR— | 61 —UN BR— |
| 9 | | | | | 0 | 0 |

In TABLE II, after cycle 1, the 11 address will either be incremented to the next-in-sequence address 12 if the branch is not taken or will branch to the 21 address if the branch is taken in accordance with the state of the T1 branch trigger. Similarly, after cycle 2, if the branch is taken to the 21 address a decision must be made as to whether the next-in-sequence address 22 is reached if the branch is not taken or if the 31 address is reached if the branch is taken. Similar branch conditions occur in cycle 4 at address 32, in cycle 5 at address 33, and in cycle 7 at address 52.

Also in TABLE II, an unconditional branch (UN BR) is taken at the end of each sequence at addresses 15, 24, 35, 53, 41 and 61 to the 0 address which is the exit address.

In order to implement the sequences of addresses in accordance with TABLE II, the addresses are loaded in the control store memories 27 and 37 of FIG. 2 in accordance with the following TABLE III and TABLE IV.

TABLE III

E CONTROL STORE A

| ADDR A | CWA | NAA |
|---|---|---|
| 0 | CWA 0 | 0 |
| . | . | . |
| 10 | CWA 10 | . |
| 11 | CWA 11 | 21 |
| 12 | CWA 12 | . |
| 13 | CWA 13 | . |
| 14 | CWA 14 | . |
| 15 | CWA 15 | 0 |

TABLE III-continued

E CONTROL STORE A

| ADDR A | CWA | NAA |
|---|---|---|
| . | . | . |
| 31 | CWA 31 | . |
| 32 | CWA 32 | 41 |
| 33 | CWA 33 | 51 |
| 34 | CWA 34 | . |
| 35 | CWA 35 | 0 |
| . | . | . |
| 61 | CWA 61 | 0 |
| . | . | . |
| N | . | . |

TABLE IV

E CONTROL STORE B

| ADDR B | CWB | NAB |
|---|---|---|
| 0 | CWB 0 | 0 |
| . | . | . |
| 21 | CWB 21 | 31 |
| 22 | CWB 22 | . |
| 23 | CWB 23 | . |
| 24 | CWB 24 | 0 |
| . | . | . |

TABLE IV-continued

| ADDR B | E CONTROL STORE B | |
|---|---|---|
|  | CWB | NAB |
| . | . | . |
| . | . | . |
| . | . | . |
| 41 | CWB 41 | 0 |
| . | . | . |
| . | . | . |
| . | . | . |
| 51 | CWB 51 | . |
| 52 | CWB 52 | 61 |
| 53 | CWB 53 | 0 |
| . | . | . |
| . | . | . |
| . | . | . |
| N | . | . |
|  | . | . |

It is apparent from inspection of TABLE III and TABLE IV that all of the addresses 11, 12, 13, 14, 15 are in the A control store 21 of TABLE III. Whenever a branch may be required from those addresses, namely at address 11 and address 15, the NAA field of control store 21 as shown in TABLE III is loaded with the branch address. For address 11 the NAA field is 21 and for address 15 the NAA address is 0.

Referring to TABLE II, all of the addresses 21, 22, 23 and 24 appear in the B control store 22 as shown in TABLE IV. Whenever a branch from one of those addresses can occur, the branch address appears in the NAB field and is branch address 31 for address 21 and is branch address 0 for address 24 in TABLE IV. In a similar manner, each of the other addresses of TABLE II is appropriately loaded in either TABLE III or TABLE IV such that any branch address is an address for the other control store.

Assuming that the control store memories have been loaded in the manner indicated in TABLE III and TABLE IV, any predetermined sequence of addresses in accordance with TABLE II can be executed.

As a typical example of sequencing addresses in accordance with the TABLE II microprogram, it is assumed that the addresses 11, 21, 31, 32, 33, 51, 52, 61 and 0 are to be accessed in that order. TABLE V shows the fetching, execution and signal states occurring to implement the sequencing example.

TABLE V

|  | EXECUTE CYCLE | | | | | | | | | | |
|---|---|---|---|---|---|---|---|---|---|---|---|
|  | 0 | 1 | 2 | 3 | 4 | 5 | 6 | 7 | 8 | 9 | 10 |
| FETCH A | 10 | 11 | 12 | 31 | 32 | 33 | 34 | — | 61 | 62 | 0 |
| FETCH B | 10 | 11 | 21 | 22 | — | 41 | 51 | 52 | 53 | 0 | 1 |
| EXECUTE | — | 10 | 11 | 21 | 31 | 32 | 33 | 51 | 52 | 61 | 0 |
| EN SET T1 | — | 1 | 0 | 0 | 1 | 0 | 0 | 1 | 0 | 0 |  |
| T1 SET | — | 0 | 1 | 0 | 0 | 0 | 0 | 0 | 1 | 0 |  |
| EN SET T2 | — | 0 | 1 | 0 | 0 | 1 | 0 | 0 | 0 | 0 |  |
| T2 SET | — | 0 | 0 | 1 | 0 | 0 | 1 | 0 | 0 | 0 |  |
| LOAD ImADDR | 1 | 0 | 0 | 0 | 0 | 0 | 0 | 0 | 0 | 0 |  |
| ImMTS | 1 | 0 | 0 | 0 | 0 | 0 | 0 | 0 | 0 | 0 |  |
| MTS | — | 1 | 1 | 0 | 1 | 1 | 1 | 0 | 0 | 1 |  |
| TKN | — | 0 | 1 | 1 | 0 | 0 | 1 | 0 | 1 | 1 |  |
| A SEL ARA + 1 | — | 1 | 0 | 1 | 1 | 1 | 0 | 0 | 1 | 0 |  |
| A SEL BR NAB | — | 0 | 1 | 0 | 0 | 0 | 1 | 1 | 0 | 1 |  |
| B SEL ARB + 1 | — | 0 | 1 | 0 | 0 | 0 | 1 | 1 | 0 | 1 |  |
| B SEL BR NAA | — | 1 | 0 | 1 | 1 | 1 | 0 | 0 | 1 | 0 |  |
| SEL A | — | 1 | 0 | 1 | 1 | 1 | 0 | 0 | 1 | 0 |  |
| SEL B | — | 0 | 1 | 0 | 0 | 0 | 1 | 1 | 0 | 1 |  |
| SET MTS | 1 | 1 | 0 | 1 | 1 | 1 | 0 | 0 | 1 | 0 |  |
| RESET MTS | 0 | 0 | 1 | 0 | 0 | 0 | 1 | 1 | 0 | 1 |  |
| EN UN BR | — | 0 | 0 | 0 | 0 | 0 | 0 | 0 | 0 | 1 |  |

Common Control For Fixed-Point Multiply—FIG. 4

In FIG. 4, another embodiment of the common control 20 of FIG. 1 is depicted. Elements in FIG. 4 corresponding to elements in FIG. 3 are identified with common reference numerals. FIG. 4 differs from FIG. 3 in that a microinstruction latch (LCS CTL LAT) 63 is provided in addition to the microinstruction latch 57. Latch 63 is loaded by an output bus 54 from the general system control 62. Typically the general system control 62 includes a separate microinstruction control store (not shown) which is pipelined with the multiple control stores of FIGS. 1 and 2. As far as the present invention is concerned, however, any conventional control apparatus may be employed in the general system control 62 which establishes the starting conditions for initiating the operation of the FIG. 2 sequencing apparatus.

Latch 63 includes an output bus 88 which may connect to many points throughout a data processing system (not shown) for controlling parts of such system which are not controlled by the sequencing apparatus of the present invention. Additionally, latch 63 includes four locations which provide initiating signals for initializing the sequencing apparatus in the present invention. Specifically, one location (1-086) provides the output line 86 supplying the ImMTS as an input to the A/B module control logic 84. Latch 63 includes three locations 1-080, 1-079, 1-084 for providing the enable signals EN SET T1, EN SET T3, EN SET T2 on the output lines 64, 65, and 66, respectively. The enable line 64 is input to the AND gates 67 and 68. The enable line 65 is input to the AND gates 69 and 70. The enable line 66 is input to the AND gates 71 and 72. The gates 67 and 68 receive a first condition signal (LUCKL-SIGN1) which, through gate 67, operates to set the first branch condition trigger 73 and which through inverter gate 76 and AND gate 68 connects to the reset (R) input of trigger 73. A second branch condition signal (LUCKH-SIGN2) connects directly to AND gate 69 and through inverter 77 to the AND gate 70. Gate 69 connects to the set (S) input of the branch condition trigger 74. AND gate 70 connects to the reset (R) input of the branch condition trigger 74.

The third branch condition line (LUCKH) v (LUCKL)=0 connects as an input to AND gate 71 and as inverted in inverter 78 to AND gate 72. Gate 71 connects to the set (S) input of the second branch condition trigger 75 and gate 72 connects as an input to the reset (R) input of the branch condition trigger 75.

In FIG. 4, the four locations of latch 63 denoted as 1-0086, 1-0080, 1-0079 and 1-0084 are identified in terms of their microprogram line number for a fixed-point multiply microprogram set forth in TABLE VI. The prefix 1 for each of those locations designates that the signals are active in the initiating cycle of the microprogram. That initiating cycle commences the operation of the dual control stores sequencing apparatus of the present invention.

In FIG. 4, the A/B control latch 57 recieves the output from the decoder 56 of FIG. 2 and latch 57 is shown in FIG. 4 with a latch portion 58 including four stages. The four stages provide the four output lines 47, 48, 49 and 50 having logical 1 or 0 levels determined by the current microinstruction command word in latch 57. The output line 47 provides the EN UN BR signal for designating an unconditional branch condition. The line 48 provides the EN BR 1 signal for designating when a first branch is reached and for causing an interrogation of the state of the SIGN 1 TRIG signal from the T1 trigger 73. Line 49 provides the branch enable signal EN BR 3 for designating whether or not a branch is present and for causing the interrogation of the state of the SIGN 2 TRIG signal from the T3 trigger 74. The output line 50 provides the branch indicating signal EN BR 2 which causes the state of the T2 trigger 75 to be interrogated.

Referring to the A/B control latch 57 and microinstruction statements within the microprogram of TABLE VI, the cycle and statement line number in which each of the signal lines 47, 48, 49 and 50 of FIG. 4 is enabled is indicated. For example, the line 48 in FIG. 4 is enabled in the 2A cycle, program line number 0099, and in the 16A cycle, program line number 0256. Similarly, the line 49 is enabled in the 2A cycle, program line number 0099 and in the 8B cycle, program line number 0172. All of the cycles and program line numbers are indicated in the box constituting latch portion 58 in FIG. 4 for each of the signal lines 47, 48, 49 and 50 so as to correspond with TABLE VI.

The operation of the FIG. 4 common control apparatus is analogous to the operation of the FIG. 3 common control apparatus.

Fixed-Point Multiply Apparatus—FIGS. 5 and 6

In FIGS. 5 and 6, apparatus useful in carrying out a fixed-point multiply operation within a data processing system is shown. The apparatus of FIGS. 5 and 6 is typical of the types of units of a data processing system which are suitable to be controlled by sequencing apparatus of the present invention. The specific details of the FIGS. 5 and 6 multiply unit are not important and are provided as an example of any one or more units within a data processing system which can be controlled by the multiple control store sequencer apparatus of the present invention.

In FIG. 5, the four 32-bit operand word registers 101, 102, 103 and 104 are provided for storing operands which are to be processed in accordance with microinstruction command words from microprogram control stores. Registers 101 and 102 provide input to the operand word register selection gates 105 and registers 103 and 104 provide inputs to the operand word register selection gates 106. Gates 105 select an input for the LUCKH gates 107 and gates 106 provide an input to the LUCKL gates 108. The gates 107 have the high-order bit transmitted by the LUCKH SIGN2 line for indicating the positive or negative sign of operand 2 selected by the gates 105. Similarly, the line LUCKL SIGN1 connects from the high-order bit of gates 108 to transmit the positive or negative sign of the operand 1 selected by the selection gates 106. Gates 107 and gates 108 select the operands to provide inputs to the LUCK unit 109, to the A register (AR) 110 and to the B register (BR) 111. The AR and BR registers 110 and 111 are each 32 bits wide.

In FIG. 5, the operands 1 and 2 output from the gates 108 and 107 are operated upon by unit 109 which performs logical, compare, compact, expand, and status operations. While such operations are convention, they are not all required for the particular example being described. For the purpose of the present invention, unit 109 detects whether or not either the operand 1 from the LUCKL gates 108 or the operand 2 from the LUCKH gates 107 is equal to ZERO to provide a branch condition indication on the (LUCKH) v (LUCKL)=0 line 15.

In FIG. 5, a byte mover 112 selectes bytes (8 bits) from the units 107 or 108 for moving such bytes to appropriate locations in the data processing system. To perform additions, the byte adder 113 receives bytes from the unit 107, unit 108, shift amount register (SAR) 116, or the byte adder register (BAR) 117. The decrementor 115 is provided to decrement the contents of SAR register 116. None of the units of this paragraph are necessary for a multiply operation and hence can be ignored. The SAR register 116 is loaded with a shift amount to control shifter 134 and 135 of FIG. 6 (see for example program line number 0098 in TABLE VI where the literal input is loaded with "8").

In FIG. 6, selection gates 126 are provided for selecting the operand from the AR register 110 and the BR register 111 from FIG. 5 and for forming five recorded copies (where the recoding is determined by the IER register 141 and recode unit 140). The five recoded copies of the selected operands are input to a carry-save adder tree 127. Outputs from the carry-save adder tree 127 are stored in a 64-bit SR register 128 and a 64-bit CR register 129. The output of the SR register 128 forms one input to a carry propagate adder (CPA) 130. The output from the CR register 129 provides a second input to the carry propagate adder 130. The third input to the carry propagate adder 130 is derived from a shifter 134 which shifts the contents of the result register 132/133 to provide a third input to the carry propagate adder 130.

In FIG. 6 a quotient register 136/137 is loaded by a quotient shifter 135. The quotient shifter shifts inputs from the AR register 110 and the BR register 111 of FIG. 5, or from the quotient regiser 136/137. Various other control and data inputs are indicated in connection with the FIG. 5 and FIG. 6 apparatus. Registers are represented by boxes with heavy bars at the top and such registers are clocked at the end of each machine cycle by a clock signal.

The apparatus of FIG. 5 and 6 is typically used to perform a fixed-point multiply. In operation, the product of the multiplier (the second operand) and the multiplicand (the first operand) replaces the multiplicand. The multiplicand and the multiplier are 32-bit operands and the product is a 64-bit operand.

The fixed-point multiply operation is carried out in accordnce with the microprogram set forth in detail in the following TABLE VI. Each program statement in TABLE VI is listed in order by a statement line number in the right-hand column.

TABLE VI

```
/* MULTIPLY (FIXED-POINT)                                              */ 0001
/*                                                                     */ 0002
/* MNEMONICS:   MR, M                                                   */ 0003
/* OP CODES:    1C, 5C                                                  */ 0004
/* FORMAT:      RR, RX                                                  */ 0005
/* OPERATION:   THE PRODUCT OF THE MULTIPLIER (THE SECOND OPERAND)      */ 0006
```

```
/*      AND THE MULTIPLICAND (THE FIRST OPERAND) REPLACES THE           */ 0007
/*      MULTIPLICAND.  THE MULTIPLICAND AND MULTIPLIER ARE 32-BIT       */ 0008
/*      OPERANDS; THE PRODUCT IS A 64-BIT OPERAND.                      */ 0009
/* CONDITION CODE:   UNCHANGED                                          */ 0010
/*                                                                      */ 0011
/* FLOW:                    +--> $19B --> 20B --> EXIT                  */ 0012
/*                          A                                           */ 0013
/*                (EITHER) |                                            */ 0014
/*                (FACTOR) |                                            */ 0015
/*                ( ZERO ) |                                            */ 0016
/*                         |                                            */ 0017
/*                   +--> $3A --> $4A --> $5A --> $6A --> $7A --> EXIT  */ 0018
/*                   A                A                                 */ 0019
/*          (BOTH ) |                 |                                 */ 0020
/*          (SIGNS)|                  |                                 */ 0021
/*          (PLUS )|                  |                                 */ 0022
/*                 |                  |                                 */ 0023
/* $1 ---> ---> $2A                   |                                 */ 0024
/*                 |           +<-- <-- <-- $18B                        */ 0025
/*          (EITHER)|                            A                      */ 0026
/*          ( SIGN )|                            |                      */ 0027
/*          (MINUS )|                            |                      */ 0028
/*                 V   (OP2 -)        (OP1 -)    |                      */ 0029
/*                $8B --------> $16A --------> $17A                     */ 0030
/*                 |                  |                                 */ 0031
/*          (OP2 +)|          |(OP1 +)                                  */ 0032
/*                 |                  |                                 */ 0033
/*                 V          V  (ONE FACTOR ZERO)                      */ 0034
/*                $9B --------> $10B -------------> $19A --> $20A       */ 0035
/*                                    |                                 */ 0036
/*                                    |                                 */ 0037
/*                                    | (BOTH FACTORS NONZERO)          */ 0038
/*                                    |                                 */ 0039
/*                                    V                                 */ 0040
/*                                   $11B ----> $12B                    */ 0041
/*                                              |                       */ 0042
/*                                              |                       */ 0043
/*                                              V                       */ 0044
/*              EXIT <-- $15B <-- $14B <-- $13B                         */ 0044
$PAGE;                                                                     0045
/* PIPELINE SEQUENCE:                                                   */ 0046
/*                                                                      */ 0047
/*      G B L E E - - - - E E E W WD                                    */ 0048
/*          |-------EUBI----|                                           */ 0049
/*                                                                      */ 0050
/* CONTROL-STORE REQUIREMENT:    ECSA = 10                              */ 0051
/*                               ECSB = 11                              */ 0052
/*                               ----------                             */ 0053
/*        LCS = 1          TOTAL ECS = 21                               */ 0054
/*                                                                      */ 0055
/* TIMING:    CYCLE-TIME = 4 + 2*NEG + NZ*(2 + NEG)                     */ 0056
/*                                                                      */ 0057
/*            WHERE NEG = 1 IF EITHER FACTOR IS NEGATIVE                */ 0058
/*                  NZ  = 1 IF BOTH FACTORS ARE NONZERO                 */ 0059
/*                                                                      */ 0060
/*         FACTOR       FACTOR       NUMBER OF CYCLES                   */ 0061
/*         ------       ------       ----------------                   */ 0062
/*         POSITIVE     POSITIVE            6                           */ 0063
/*         POS  | 0        0                4                           */ 0064
/*         POSITIVE     NEGATIVE            9                           */ 0065
/*            0         NEGATIVE            6                           */ 0066
/*         NEGATIVE     NEGATIVE            9                           */ 0067
/*                                                                      */ 0068
$PAGE;                                                                     0069
BEGIN MR;                                                                  0070
                                                                           0071
CSECT LCS;                                                                 0072
                                                                           0073
EUMR EXTERNAL;  EUM EXTERNAL;   $1;                                        0074
    OWRH -> OWRSELH,                                                       0075
    OWRL -> OWRSELL,                                                       0076
    OWRSELH -> LUCKH,      /* OP2 */                                       0077
    OWRSELL -> LUCKL,      /* OP1 */                                       0078
    LUCKH_SIGN -> SIGN2_TRIGGER,                                           0079
    LUCKL_SIGN -> SIGN1_TRIGGER,                                           0080
```

```
              0 -> SAR,                                                              0081
              LUCKH -> AR,                                                           0082
              LUCKL -> BR,                                                           0083
              IF LUCKH=0 OR LUCKL=0 THEN 1 ELSE 0 ENDF -> ZERO_TRIGGER,               0084
              1 -> TEST_DATA_VALID,                                                  0085
              ECSA -> CONTROL_STORE,                                                 0086
              $2A -> ECS_ADDR;                                                       0087
                                                                                     0088
       CSECT ECSA;                                                                   0089
                                                                                     0090
       $2A:   0 -> BR,                                                               0091
              (0/(0..31),BR/(32..63)) -> QRSH,                                       0092
              QRSH -> QR,                                                            0093
              (AR_INV/(0..31),BR_INV/(32..63)) -> CPA2,                              0094
              0 -> CPA3,                                                             0095
              HOT_CARRY_63 -> ADDER_CARRY_IN,                                        0096
              (0/(0..31),CPA(32..63)/(32..63)) -> RR,                                0097
              8 -> SAR,                                                              0098
              SIGN1_TRIGGER | SIGN2_TRIGGER -> BRANCH,                               0099
              $8B -> BRANCH_ADDRESS;                                                 0100
                                                                                     0101
       $3A:   0 -> RR,                    /* BOTH OPERANDS POSITIVE */               0102
              QR(56..63) -> IER_RECODE,                                              0103
              QR -> QRSH,                                                            0104
              QRSH -> QR,                                                            0105
              0 -> QR_SHIFT_IN,                                                      0106
              RIGHT -> SHIFT_DIRECTION,    /* 1ST MULTIPLY */                        0107
              LOGICAL -> SHIFT_TYPE,                                                 0108
              8 -> SAR,                                                              0109
              ZERO_TRIGGER -> BRANCH,                                                0110
              $19B -> BRANCH_ADDRESS;                                                0111
                                                                                     0112
       $4A:   /* BOTH OPERANDS POSITIVE OR BOTH OPERANDS NEGATIVE */                 0113
              SR -> CPA1,                  /* (PRODUCT IS POSITIVE)    */            0114
              CR -> CPA2,                                                            0115
              RRSH -> CPA3,                                                          0116
              CPA -> RR,                                                             0117
              QR(56..63) -> IER_RECODE,                                              0118
              QR -> QRSH,                                                            0119
              QRSH -> QR,                  /* 2ND MULTIPLY, 1ST ADD */               0120
              0 -> QR_SHIFT_IN,                                                      0121
              RIGHT -> SHIFT_DIRECTION,                                              0122
              LOGICAL -> SHIFT_TYPE,                                                 0123
              8 -> SAR;                                                              0124
       %PAGE;                                                                        0125
       $5A:   SR -> CPA1,                                                            0126
              CR -> CPA2,                  /* 3RD MULTIPLY, 2ND ADD */               0127
              RRSH -> CPA3,                                                          0128
              CPA -> RR,                                                             0129
              QR(56..63) -> IER_RECODE,                                              0130
              QR -> QRSH,                                                            0131
              QRSH -> QR,                                                            0132
              0 -> QR_SHIFT_IN,                                                      0133
              RIGHT -> SHIFT_DIRECTION,                                              0134
              LOGICAL -> SHIFT_TYPE,                                                 0135
              8 -> SAR;                                                              0136
                                                                                     0137
       $6A:   SR -> CPA1,                                                            0138
              CR -> CPA2,                  /* 4TH MULTIPLY, 3RD ADD */               0139
              RRSH -> CPA3,                                                          0140
              CPA -> RR,                                                             0141
              QR(56..63) -> IER_RECODE,                                              0142
              QR -> QRSH,                                                            0143
              QRSH -> QR,                                                            0144
              0 -> QR_SHIFT_IN,                                                      0145
              RIGHT -> SHIFT_DIRECTION,                                              0146
              LOGICAL -> SHIFT_TYPE,                                                 0147
              8 -> SAR,                                                              0148
              LLFC -> LFCL,                                                          0149
              0 -> EUBI;                                                             0150
                                                                                     0151
       $7A:   SR -> CPA1,                                                            0152
              CR -> CPA2,                  /* 4TH ADD */                             0153
```

```
           RRSH -> CPA3,                                            0154
           CPA -> RR,                                               0155
           LLFC -> LFCL,                                            0156
           0 -> EUBI,                                               0157
           1 -> BRANCH,                                             0158
           EXIT_LOOP_B -> BRANCH_ADDRESS;                           0159
                                                                   0160
   CSECT ECSB;                                                     0161
                                                                   0162
   $8B:              /* EITHER OR BOTH OPERAND(S) IS (ARE) NEGATIVE */ 0163
           RRL -> LUCKL,        /* OP2 INVERTED */                  0164
           AR -> LUCKH,         /* OP1         */                   0165
           LUCKL -> BR,                                             0166
           0 -> SAR,                                                0167
           (AR_INV/(0..31),0/(32..63)) -> CPA2,                     0168
           0 -> CPA3,                                               0169
           HOT_CARRY_31 -> ADDER_CARRY_IN,                          0170
           CPA -> RR,           /* OP1 INVERTED */                  0171
           SIGN2_TRIGGER -> BRANCH,                                 0172
           $16A -> BRANCH_ADDRESS;                                  0173
                                                                   0174
   $9B:    RRH -> LUCKH,        /* OP1 NEGATIVE, OP2 POSITIVE */   0175
           0 -> LUCKL,                                              0176
           LUCKH -> AR,                                             0177
           LUCKL -> BR,                                             0178
           8 -> SAR;                                                0179
   %PAGE;                                                          0180
   $10B:             /* ONE OPERAND IS POSITIVE, THE OTHER IS NEGATIVE */ 0181
           0 -> RR,             /* (THEREFORE, THE PRODUCT IS NEGATIVE) */ 0182
           QR(56..63) -> IER_RECODE,                                0183
           QR -> QRSH,                                              0184
           QRSH -> QR,          /* 1ST MULTIPLY */                  0185
           0 -> QR_SHIFT_IN,                                        0186
           RIGHT -> SHIFT_DIRECTION,                                0187
           LOGICAL -> SHIFT_TYPE,                                   0188
           8 -> SAR,                                                0189
           ZERO_TRIGGER -> BRANCH,                                  0190
           $19A -> BRANCH_ADDRESS;                                  0191
                                                                   0192
   $11B:   SR -> CPA1,                                              0193
           CR -> CPA2,          /* 2ND MULTIPLY, 1ST ADD */         0194
           RRSH -> CPA3,                                            0195
           CPA -> RR,                                               0196
           QR(56..63) -> IER_RECODE,                                0197
           QR -> QRSH,                                              0198
           0 -> QR_SHIFT_IN,                                        0199
           QRSH -> QR,                                              0200
           RIGHT -> SHIFT_DIRECTION,                                0201
           LOGICAL -> SHIFT_TYPE,                                   0202
           8 -> SAR;                                                0203
                                                                   0204
   $12B:   SR -> CPA1,                                              0205
           CR -> CPA2,          /* 3RD MULTIPLY, 2ND ADD */         0206
           RRSH -> CPA3,                                            0207
           CPA -> RR,                                               0208
           QR(56..63) -> IER_RECODE,                                0209
           QR -> QRSH,                                              0210
           QRSH -> QR,                                              0211
           0 -> QR_SHIFT_IN,                                        0212
           RIGHT -> SHIFT_DIRECTION,                                0213
           LOGICAL -> SHIFT_TYPE,                                   0214
           8 -> SAR;                                                0215
                                                                   0216
   $13B:   SR -> CPA1,                                              0217
           CR -> CPA2,          /* 4TH MULTIPLY, 3RD ADD */         0218
           RRSH -> CPA3,                                            0219
           CPA -> RR,                                               0220
           QR(56..63) -> IER_RECODE,                                0221
           QR -> QRSH,                                              0222
           QRSH -> QR,                                              0223
           0 -> QR_SHIFT_IN,                                        0224
           RIGHT -> SHIFT_DIRECTION,                                0225
           LOGICAL -> SHIFT_TYPE,                                   0226
           8 -> SAR;                                                0227
```

```
$14B:   SR -> CPA1,
        CR -> CPA2,                     /* 4TH ADD */
        RRSH -> CPA3,
        CPA -> RR,
        LLFC -> LFCL,
        0 -> EUBI;

$15B:   RR_INV -> CPA3,                 /* NEGATE PRODUCT */
        HOT_CARRY_63 -> ADDER_CARRY_IN,
        CPA -> RR,
        LLFC -> LFCL,
        0 -> EUBI,
        1 -> BRANCH,
        EXIT_LOOP_A -> BRANCH_ADDRESS;
$PAGE;
CSECT ECSA;

$16A:                                   /* OP2 IS NEGATIVE */
        AR -> LUCKH,    /* OP1 */
        0 -> LUCKL,
        LUCKH -> AR,
        LUCKL -> BR,
        (0/(0..31),BR/(32..63)) -> QRSH,
        QRSH -> QR,
        RR -> CPA3,
        CPA3 -> RR,     /* OP1 NEGATED */
        8 -> SAR,
        -SIGN1_TRIGGER -> BRANCH,
        $10B -> BRANCH_ADDRESS;

$17A:   RRH -> LUCKH,   /* BOTH OPERANDS ARE NEGATIVE */
        0 -> LUCKL,
        LUCKH -> AR,
        LUCKL -> BR,
        1 -> BRANCH,
        $18B -> BRANCH_ADDRESS;

CSECT ECSB;

$16B:   0 -> RR,
        QR(56..63) -> IER_RECODE,
        QR -> QRSH,
        QRSH -> QR,
        0 -> QR_SHIFT_IN,
        RIGHT -> SHIFT_DIRECTION,
        LOGICAL -> SHIFT_DIRECTION,
        8 -> SAR,
        1 -> BRANCH,
        $4A -> BRANCH_ADDRESS;

CSECT ECSA;

$19A:   0 -> EUBI,                      /* PRODUCT IS ZERO */
        LLFC -> LFCL;

$20A:   0 -> RR,
        LLFC -> LFCL,
        0 -> EUBI,
        1 -> BRANCH,
        EXIT_LOOP_B -> BRANCH_ADDRESS;

CSECT ECSB;

$19B:   0 -> EUBI,                      /* PRODUCT IS ZERO */
        LLFC -> LFCL;

$20B:   0 -> RR,
        LLFC -> LFCL,
        0 -> EUBI,
        1 -> BRANCH,
        EXIT_LOOP_A -> BRANCH_ADDRESS;
```

In TABLE VI, the first sixty lines are explanatory test about the microprogram. The microprogram begins in line 0070 where the initial conditions for entry into the microprogram are provided in lines 0075 through 0087. Each of the statements in line 0075 through 0087 corresponds to a control signal which is typically derived from the output of a control store latch 63 as shown in FIG. 4. More specifically, the line 75 statement causes the second operand stored in the operand word register 101 to be selected by the selection gates 105 in FIG. 5.

In line 0076, the first operand resident in the operand word register 104 is selected by the selection gates 106 in FIG. 5. In line 0076, gates 105 are controlled to gate the second operand as an input to the LUCKH gates 107 in FIG. 5.

In line 0078, selection gates 106 gate the first operand as an input to the LUCKL gates 108 in FIG. 5.

In line 0079, the EN SET T3 signal on line 65 is activated to enable the AND gates 69 and 70 in FIG. 4. This operation enables the sign of operand 2 to set or reset the condition trigger 74 in FIG. 4 on the next clock cycle.

In line 0080, the EN SET T1 signal enables gates 67 and 68 to enable the sign of the first operand to be stored in the condition trigger 73 in FIG. 4.

In line 0081, the SAR register 116 of FIG. 5 is forced to all zeros.

In line 0082, LUCKH gates 107 are enabled to gate the second operand into the AR register 110 in FIG. 5.

In line 0083, the LUCKL gates 108 are enabled to gate the first operand into the BR register 111 in FIG. 5.

In line 0084, the logical unit 109 in FIG. 5 is enabled to provide an output signal on line 15 as a logical 1 if either operand 1 or operand 2 is a zero or to provide line 15 as a logical 0 if both operands are nonzero.

In line 0085, data is tested to insure that it is valid.

In line 0086, the ImMTS signal on line 86 and LOAD ImADDR signal on line 87 of FIG. 4 are each set to a logical 1 to signal to the common control 20 that a microprogram sequence using the dual control stores of FIG. 2 is about to be entered.

In line 0087, the starting address of the microprogram for a fixed-point multiply is provided in the start address bus 42 in FIG. 4. All of the commands set forth above in lines 0075 through 0087 are effective to be executed during the first cycle which initiates the microprogram.

The sequence of the fixed-point multiply microprogram is shown in one format in TABLE VI lines 0012 through 0044. The address sequencing for the fixed-point multiply is also shown in the following TABLE VII where TABLE VII has a format which corresponds to the format set forth in TABLE II above. The entries in TABLE VII corresponds to those entries in TABLE VI immediately preceeded by the symbol "$" and followed by the symbol ":".

The microprogram of TABLE VI causes the multiplier apparatus of FIGS. 5 and 6 to execute a fixed-point multiply and such execution utilizes the multiple module control store of the present invention.

While the invention has been particularly shown and described with reference to the preferred embodiments thereof, it will be understood by those skilled in the art that those changes in form and details may be made therein without departing from the spirit and the scope of the invention.

What is claimed is:

1. Sequencing apparatus for controlling units of a data processing system comprising:
   first and second control store means, each one of said

TABLE VII

| 1 | | | | | | |
|---|---|---|---|---|---|---|
| | SIGN1 TRIG V SIGN2 TRIG | | | | | |
| 2A | | | | | | |
| 3A ZERO/TRIG | | 8B SIGN2 TRIG | | | | |
| •4A | 19B | 9B | | 16A −SIGN1 TRIG | | |
| 5A | 20B UN BR | •10B ZERO/TRIG | | 17A UN BR | [10B] | |
| 6A | | EXIT A | 11B | 19A | 18B UN BR | |
| 7A UN BR | | 12B | 20A UN BR | | [4A] | |
| | | EXIT B | 13B | | EXIT B | |
| | | | 14B | | | |
| | | | 15B ─── | | | |
| | | | EXIT A | | | | control store means having locations for storing microinstruction control words for controlling said units, each one of said control store means having locations for storing branch addresses where the branch addresses are accessible with the control words, said branch addresses from said first control store means for addressing said second control store means and said branch addresses from said second control store means for addressing said first control store means, each one of said control store means having means for providing a next-in-order address, and each one of said control store means having selection means for selecting a next-in-order address or a branch address to access a control word and a branch address from the other one of said control store means, output means in communication with said first and second control store means and said units for selecting a control word either from said first control store means or from said second control store means for controlling said units, control means including means for generating a selection signal connected for controlling the sequencing of addresses selected by said selection means in both said first and said second control store means and said control means including means for accessing both said first and second control store means concurrently in the same cycle whereby each of said first and second control store means provides a branch address for the other one of said control store means in said same cycle.

2. The apparatus of claim 1 wherein said control means includes selection store means for storing said selection signal for indicating which one of the control store means was last selected to provide a control word, and includes logic means for setting said selection signal.

3. The apparatus of claim 2 wherein said control means includes condition store means for storing a condition signal having different states in accordance with the condition of one of said units and including interrogation means for interrogating said condition store means to determine the state of said condition signal for controlling the selection of said next-in-order address or said branch address and thereby determining whether a branch is taken or not taken.

4. The apparatus of claim 3 including means for enabling said interrogation means in response to a microinstruction control word selected by said output means.

5. The apparatus of claim 2 wherein each of said control store means includes an address register for storing a current address for addressing said control store means and includes selection means for gating into said address register the next address for addressing said control store means.

6. The apparatus of claim 5 wherein each of said control store means includes an incrementer for incrementing by one the current address in said address register to form the next-in-order address.

7. The apparatus of claim 2 wherein said output means includes latch means for storing the control word selected from said first control store means or from said second control store means.

8. The apparatus of claim 7 wherein microinstruction control words stored in each of said first control store means and said second control store means are encoded and wherein said output means includes a decoder connected between each of said control store means and said latch means for decoding the selected control word.

9. Sequencing apparatus for controlling units of a data processing system comprising:

first and second control store means, each one of said control store means having locations for storing microinstruction control words for controlling said units, each one of said control store means having locations for storing branch addresses where the branch addresses are accessible with the control words, said branch addresses from said first control store means for addressing said second control store means and said branch addresses from said second control store means for addressing said first control store means, each one of said control store means having means for providing a next-in-order address, and each one of said control store means having selection means for selecting a next-in-order address or a branch address to access a control word and a branch address from the other one of said control store means, output means in communication with said first and second control store means and said units for selecting a control word either from said first control store means or from said second control store means for controlling said units, control means for generating a selection signal connected for controlling the sequencing of addresses selected by said selection means in both said first and said second control store means, wherein said control means includes one or more branch condition stores, enabling means responsive to control words for enabling the setting of said branch condition stores as a function of the state of branch conditions from one or more of said units, interrogation means responsive to a control word for interrogating the state of said branch condition stores, said interrogation means including branch taken indicator means for providing a taken signal indicating whether a branch is taken or not taken, selection store means for storing a selection signal for indicating a selected one of said first control means or said second control means, control logic means responsive to said taken signal from said branch taken indicator means and to said selection signal from said selection store means for controlling the selection of the next-in-order address or the branch address for each of said control store means.

10. The apparatus of claim 9 further including general system control means for establishing a starting address as the current address for said first and second control store means and for establishing the state of said selection store means.

11. The apparatus of claim 10 in which said output means includes selection means for selecting initial conditions from said general system control in a first cycle and for selecting control words from said first and second control store means in subsequent cycles.

12. The apparatus of claim 10 further including second latch means for storing initial conditions from said general system control means and means for enabling said branch taken indicator means and said interrogation means in response to said initial conditions.

13. In a data processing system having apparatus including first and second control store means each having locations for storing microinstruction control words for controlling units of said system and each having locations for storing branch addresses accessible with said control words when addressed by first and second current addresses, respectively, the method comprising, accessing in each of a plurality of cycles a first control word and a second control word and a first branch address and a second branch address from said first and second control store means, respectively, addressed by first and second current addresses, selecting in each of said cycles one of said first and second control words to provide a selected control word for controlling said units, incrementing in each of said cycles said first and second current addresses to form first and second next-in-order nonbranch addresses, selecting in each of said cycles either said first next-in-order nonbranch address or said second branch address as the next address for addressing said first control store means in a next cycle, selecting in each of said cycles either said second next-in-order nonbranch address or said first branch address as the next address for addressing said second control store means in said next cycle.

14. The method of claim 13 wherein said selection of the next address for each of said control store means is conditioned on whether or not a branch specified in said selected control word is taken or not taken.

15. Sequencing apparatus for controlling units of a data processing system comprising, a plurality of control store means, each one of said control store means having locations for storing microinstruction control words for controlling said units, each one of said control store means having locations for storing branch addresses accessible with said control words when addressed by current addresses, one current address for each of said control store means, said branch addresses from each one of said control store means for addressing another one of said control store means, addressing means in communication with each of said control store means, each for addressing one of said control store means with one of said current addresses to access a current control word and a current branch address, means responsive to one of said units for setting the state of a branch condition, output means in communication with said plurality of control store means for selecting a current control word, said current control word specifying a conditional branch indication from one of said control store means, each of said control store means including incrementer means for incrementing the current address to provide a next-in-order nonbranch address, each of said control store means having next address selection means for selecting either a next-in-order nonbranch address or a branch address to access a new control word and new branch address from said control store means, control means in communication with said plurality of control store means for controlling said next address selection means and for controlling the sequencing of addresses in all of said control store means as a function of the state of said branch condition when said conditional branch indication is present.

16. The apparatus of claim 15 wherein said control means includes selection store means for storing selection signals for indicating which one of said control store means is selected to provide a control word and includes logic means for storing a selection signal in said selection store means as a function of said branch indication and the state of said branch condition.

17. The apparatus of claim 15 wherein said control means includes one or more branch condition stores, enabling means responsive to a control word for enabling the setting of said branch condition stores as a function of the state of branch conditions from one or more of said units, interrogation means responsive to a control word for interrogating the state of said branch condition stores, said interrogation means including branch taken indicator means providing a taken signal indicating whether a branch is taken or not taken, selection store means storing a selection signal for indicating a selected one of said control store means, control logic means responsive to said taken signal from said branch taken indicator means and to said selection signal from said selection store means for controlling the selection of the next-in-order nonbranch address or the branch address for each of said control store means.

18. Sequencing apparatus for controlling units of a data processing system said system operating in accordance with periodic clock cycles, said sequencing apparatus comprising, a plurality of control store means, each having locations for storing microinstruction control words for controlling said units, each having locations for storing branch addresses accessible with said control words when addressed by current addresses in a current one of said clock cycles, one current address for each of said control store means, said branch addresses from each one of said control store means for addressing another one of said control store means, a plurality of addressing means one for each of said control store means, each for addressing one of said control store means with one of said current addresses to access a current control word and a current branch address in said current one of said clock cycles, means responsive to one of said units for setting the state of a branch condition not later than said current one of said clock cycles, output means in communication with said plurality of control store means and said units for selecting in said current one of said clock cycles a current control word, said control word specifying a conditional branch indication from one of said control store means, each of said control store means including incrementer means for incrementing the current address in said current one of said clock cycles to provide a next-in-order nonbranch address, each of said control store means having next address selection means, operable in said current one of said clock cycles, for selecting either a next-in-order nonbranch address from said incrementer means or a branch address from another of said control store means to access a new control word and new branch address from said control store means in the next one of said clock cycles after said current one of said clock cycles, control means connected for controlling said next address selection means operable in said current one of said clock cycles for controlling said next address selection means to select either said branch address or said nonbranch address in all of said control store means as a function of the state of said branch condition when said conditional branch indication is present.

19. The apparatus of claim 18 wherein said control means includes selection store means for storing selection signals in said current one of said clock cycles for indicating which one of said control store means is active and includes logic means for setting said selection means during said current one of said cycles for use in said next one of said clock cycles as a function of said branch indication and the state of said branch condition in said current one of said clock cycles.

20. The apparatus of claim 18 wherein said common control means includes one or more branch condition stores, enabling means responsive to a control word for enabling the setting of said branch condition stores in a prior one of said clock cycles prior to said current one of said clock cycles as a function of the state of branch conditions from one or more of said units, interrogation means responsive to a control word accessed in said current one of said clock cycles for interrogating the state of said branch condition stores in said current one of said clock cycles, said interrogation means including branch taken indicator means indicating in said current one of said clock cycles whether a branch is taken or not taken, selection store means storing a selection signal for indicating in said current one of said clock cycles a selected one of said control store means, control logic means responsive to said taken signal from said branch taken indicator means and to said selection signal from said selection store means to determine the state of said condition signal for controlling in said current one of said clock cycles the selection of the next-in-order non-branch address or the branch address for each of said control store means.

* * * * *